United States Patent
Falardeau

(10) Patent No.: US 7,620,065 B2
(45) Date of Patent: Nov. 17, 2009

(54) MOBILE CONNECTIVITY SOLUTION

(75) Inventor: Eric Falardeau, Montreal (CA)

(73) Assignee: Trellia Networks, Inc., Montreal Quebec (CA)

( * ) Notice: Subject to any disclaimer, the term of this patent is extended or adjusted under 35 U.S.C. 154(b) by 975 days.

(21) Appl. No.: 11/188,047

(22) Filed: Jul. 22, 2005

(65) Prior Publication Data

US 2007/0019670 A1    Jan. 25, 2007

(51) Int. Cl.
*H04J 3/16* (2006.01)
(52) U.S. Cl. .................................. 370/465
(58) Field of Classification Search ............... 370/465, 370/338, 392, 401, 230, 400, 389, 339, 341, 370/349, 471, 356, 902, 395.52; 455/41.2, 455/557; 709/219, 227
See application file for complete search history.

(56) References Cited

U.S. PATENT DOCUMENTS

| 7,302,229 | B2 * | 11/2007 | Riddles | 455/41.2 |
| 7,536,192 | B2 * | 5/2009 | O'Neill | 455/509 |
| 2002/0198980 | A1 | 12/2002 | Najafi et al. | 709/224 |
| 2005/0066033 | A1 | 3/2005 | Cheston et al. | 709/225 |
| 2005/0096024 | A1 | 5/2005 | Bicker et al. | 455/417 |

OTHER PUBLICATIONS

International Search Report for Application PCT/IB2005/002153.
Written Opinion of the Searching Authority PCT/IB2005/002153.

* cited by examiner

*Primary Examiner*—Chi H Pham
*Assistant Examiner*—Alexander Boakye
(74) *Attorney, Agent, or Firm*—Nixon Peabody LLP

(57) ABSTRACT

A method and application for selecting a network from one or more candidate networks is disclosed. Information is gathered from one or more database relating to each of the one or more candidate networks and is harmonized in relation to an associated network type. The harmonized information is evaluated to allocate a weight to each of the candidate networks. The weight represents the desirability of each of the candidate networks. The required resources to connect to each of the candidate networks are determined from information contained within the service-provider database, from information obtained by the end-user, and by self-adaptive learning algorithms. At least one of the candidate networks is selected based on the allocated weight of the candidate network and the application attempts to connect to the candidate network. The method and application incorporates the ability to control and integrate a plurality of services on a user device via the candidate network.

25 Claims, 9 Drawing Sheets

MOBILE CONNECTIVITY SOLUTION

FIELD OF THE INVENTION

The present invention relates generally to network connectivity by mobile devices and, more particularly, to a system and method for connecting devices to multiple network types via a unified access mechanism.

BACKGROUND OF THE INVENTION

The ability to connect mobile devices, such as laptop computers, handheld devices or a cellular telephone, to a computer network is a rapidly emerging technology. Although mobile connectivity has matured over the past few years, it continues to be a segmented and fast-changing industry, with new technology constantly being developed. Mobile communication has made a significant impact on most organizations already, and as the technologies continue to improve, so will the demand for efficient and convenient connectivity.

The availability of laptop computers that rival the power of desktop computers has begun a mobile workforce revolution. Now, an entire population of sales representatives, consultants, field technical specialists, and other mobile workers carry computers as part of their jobs, and use their computers to do work. The problem, of course, is that these mobile workers leverage only a small fraction of the power of their computers. Without a network connection, these workers are cut off from the enterprise systems and data they need to be fully productive.

In today's wireless network environment, networks are provided in a variety of types and flavors. For example, at a particular location a user may have a choice of access points between Wi-Fi (wireless fidelity), WiMax, GPRS (General Packet Radio Service), CDMA (Code-Division Multiple Access), 3G (third-generation wireless), and/or wireline access. Those various types of access points have unique media-layer and link-layer negotiations (e.g., SIM, serial number registrations, 802.3, 802.11). Additionally, the logon scheme is not necessarily identical, or even similar, between the same types of access point when offered by different providers. Thus, a user is forced to remember numerous login procedures—dependant upon the specific network location and type—to obtain access to a network (if they can gain access at all).

Wi-Fi, 3G cellular, and Enterprise (i.e., private Wireless Local Area Neworks or WLANs) all represent islands of wireless connectivity. They are islands because users cannot typically roam among these access networks. Individually, each of these islands is riddled with problems. For example, the Wi-Fi business problem is not simple; too many different accounts with service providers are required to stay connected through Wi-Fi with any reliability beyond the home or office. Additionally, there is no seamless roaming among Wi-Fi networks because of the wide variety and complexity of connectivity requirements. While there are a lot of Wi-Fi users, the majority of potential customers for public access cannot justify an investment in wireless service that connects them only at their favorite coffee shop or fast food counter, but not at airports, hotels, or convention centers. Thus, the lack of carrier-class wireless roaming service is impeding the growth of Wi-Fi.

As for cellular connectivity, mobile operators worldwide are embarking, for the first time, on the deployment of wireless data services as part of the rollout of 2.5G/3G networks. The challenge for carriers will be to generate customer uptake of these services in the context of much faster wireless connectivity made possible by Wi-Fi. While some mobile carriers are engaging in the deployment of discreet Wi-Fi services (i.e., a service that does not roam onto cellular networks), most mobile operators view Wi-Fi as a complement to future cellular data services. Specifically, users would use cellular in the Wireless Wide Area Network (WWAN) and then Wi-Fi in the Metropolitan Area Network (MAN), which has the added benefit of offloading high data traffic from congested MAN cellular switches.

Enterprises were the first to deploy Wi-Fi in the form of WLANs. However, wireless connectivity does not typically extend beyond the walls of the enterprise for reasons of security. Most enterprises continue to use Virtual Private Networks (VPNs) over dialup connections but discourage the use of Wi-Fi hotspots to connect to corporate LANs for reasons of security. With the introduction of the new Wi-Fi security standard (802.11i) this might change, although it mostly adds complexity to the user experience by introducing yet another type of authentication. But the fact remains, that the solutions capable of supporting any third-party VPN client over a wireless connection on the market today are very limited and typically involve additional servers that are deployed in an enterprise infrastructure.

It would be desirable to have a unified method, local to the user device, that addresses these and other issues.

SUMMARY OF THE INVENTION

According to one embodiment of the present invention, a method for selecting a network from one or more candidate networks is disclosed. The method comprises gathering information relating to each of the one or more candidate networks. The information is gathered from a service-provider database, a user-preferences database, an accumulated-experience database, or any combination thereof. The method further comprises harmonizing the gathered information in relation to an associated network type. The method further comprises evaluating the harmonized information to allocate a weight to each of the candidate networks. The weight represents the desirability of each of the candidate networks. The method further comprises determining the required resources to connect to each of the candidate networks from information contained within the service-provider database, from information obtained by the end-user, and by self-adaptive learning algorithms. The method further comprises selecting at least one of the candidate networks to attempt to connect to based on the allocated weight of the candidate network.

According to another embodiment of the present invention, a method to control and integrate a plurality of services on a user device is disclosed. The method comprises determining a mobile-device connectivity context. The plurality of services to integrate are dependent on the connectivity context. The method further comprises defining each of the plurality of services by a set of preconditions to be satisfied and by a set of resources to be launched. The method further comprises transforming each of the set of preconditions into a set of goals to be monitored. The method further comprises monitoring the goals utilizing specialized monitoring components. The method further comprises launching the appropriate resources once the goals have been satisfied.

According to yet another embodiment of the present invention, a method for connecting to a network on a plurality of mobile devices is disclosed. The method comprises accumulating statistics and location information on a first mobile device. The statistics and location information relating to a plurality of networks accessible to the mobile device. The method further comprises communicating the accumulated information to a logically centralized database. The method further comprises distributing the accumulated information stored in the central database to the plurality of mobile devices to provide the plurality of mobile devices with up-to-date connection rules for connecting to the previously located plurality of networks. The method further comprises connecting one or more of the plurality of mobile devices to one of the plurality of networks utilizing the connection rules distributed from the logically centralized database.

The above summary of the present invention is not intended to represent each embodiment, or every aspect, of the present invention. This is the purpose of the Figures and the detailed description which follow.

BRIEF DESCRIPTION OF THE DRAWINGS

The foregoing and other advantages of the invention will become apparent upon reading the following detailed description and upon reference to the drawings.

Figure 1:
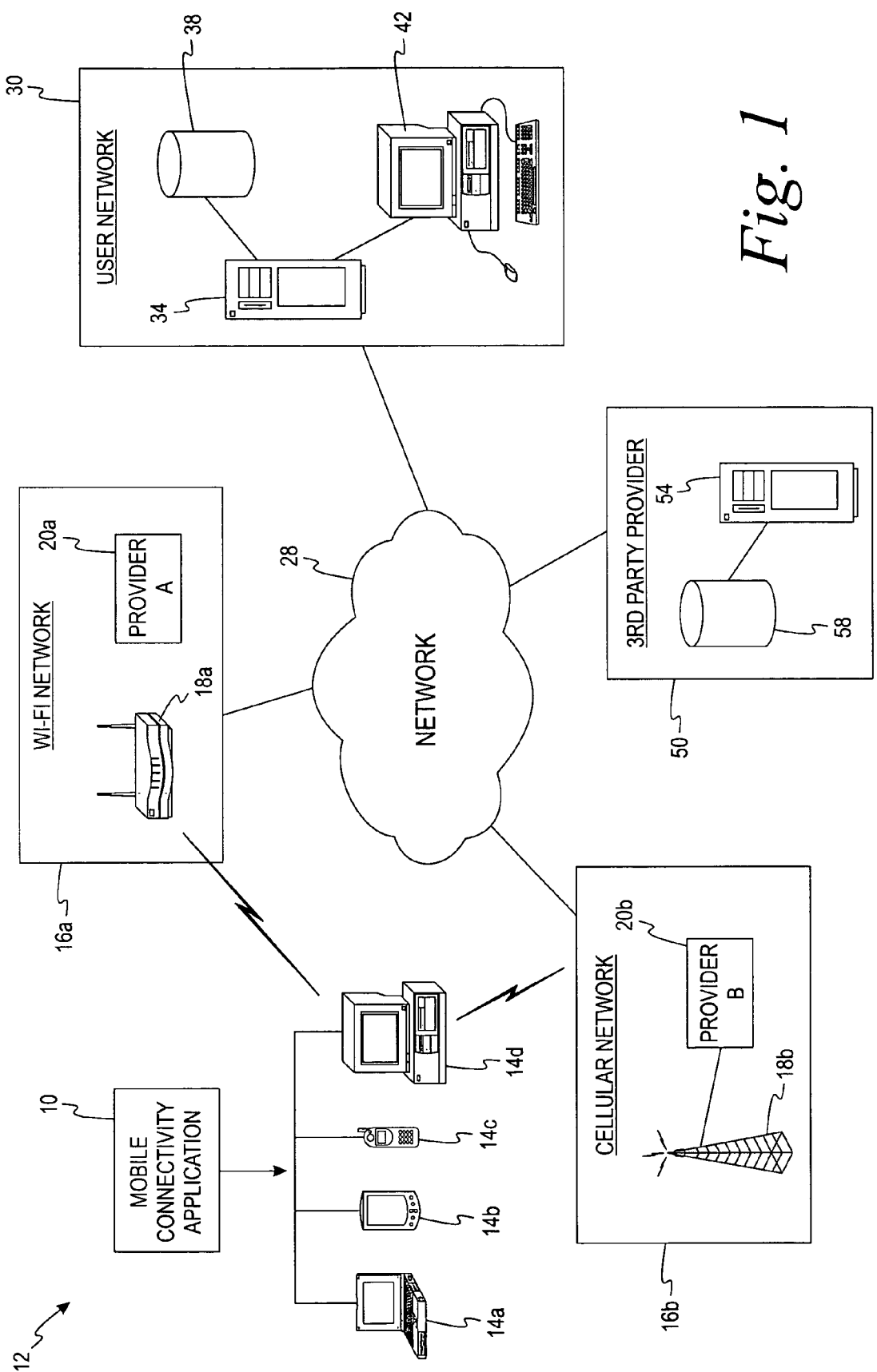
FIG. 1 is schematic illustration of a mobile-connectivity application within a mobile networking system, according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF THE ILLUSTRATIVE EMBODIMENTS

The present invention is directed to a mobile connectivity solution providing a unified method of gaining access to multiple network types, with function rich features that increase efficiency and revenues for wireless operators. Wireless communications are undergoing a convergence of access and transport technologies including cellular data, wireless LAN (Wi-Fi), and IP. The emerging landscape is a wireless broadband Internet accessible anywhere, anytime. However, to support this new demand for data roaming services, a new class of connectivity solution is required. The mobile connectivity solution is a unified method that delivers seamless data roaming coverage over a variety of wireless and wireline access points. The mobile connectivity solution also automates the management of connectivity resources such as aircards, dialers, DSL, etc., for greater user acceptance. Users will be able to move seamlessly across different technologies and network domains, freely accessing mixed sets of voice, data and multimedia services and utilizing applications that add value to the basic connectivity service, such as presence and location information. The mobile connectivity solution can be the backbone of a bundled access solution to the wireless broadband Internet, enabling a new class of revenue-generating wireless data services at a low operational cost to the carrier.

The mobile connectivity solution is a nearly transparent application continuously working in the background to connect a user to a list of preferred networks that has been created by the carrier. The mobile connectivity solution can also connect the user to new networks not on the list and automatically store that information for future use. The mobile connectivity solution is capable of learning user preferences and selecting from the available access points based on the user's preferences and from patterns emerging from previous connections.

The mobile connectivity solution is an intelligent software connectivity and service management platform that resides on the end-user's device (e.g., laptop, PDA, smart phone, etc.). The solution automates "always on, always connected" transparent connectivity to Wi-Fi, cellular, and wireline networks and provides seamless roaming between any network, including Enterprise networks accessed through third-party Virtual Private Networks (VPNs). The mobile connectivity solution enables the bundling of Wi-Fi and cellular data services into a single, branded, carrier-grade offering, thus facilitating the delivery of new revenue generating services (e.g., content, video, games, LBS, VPN, IMS/Mobile IP, Mobile Office, etc.) that increases usage and service penetration.

The mobile connectivity solution is a decision-making software application. Rather than deploying the absolute rules of an algorithm, the mobile connectivity solution deploys a heuristic approach with an ability to adapt and learn from experience. As will be detailed below, the mobile connectivity solution applies itself to the full range of connectivity requirements: identifying interface types (Wi-Fi, cellular, etc.); establishing the correct level of security (EAP/802.1x, WEP, WPA, etc.); compliance with roaming agreements; employing user preferences; dynamically adapting to network conditions (previous failures), economics (less costly connections); user interventions (favoring networks requiring less prompts or for which the required information is already known); signal strength; and so forth.

Referring now to the drawings, and initially to FIG. 1, a mobile-connectivity application 10 is illustrated within a mobile networking system 12, according to one embodiment of the present invention. The mobile-connectivity application 10 is located on a plurality of user devices 14, such as, for example, a laptop computer 14a, a personal digital assistant (PDA) 14b, a smartphone 14c, a computer 14d, etc. The user devices 14 may wirelessly communicate with a plurality of wireless networks 16, such as, a Wi-Fi network 16a, a cellular network 16b, or other similar network. Additionally, the user devices 14 may be adapted to communicate over a wireline with a network. The wireless networks 16 establish a Wireless Local Area Network (WLAN) that allows the user device 14 to connect to a Local Area Network (LAN) via a wireless connection. The wireless networks 16 provide a Point-Of-Presence (POP) from the wireless network 16 to the rest of the Internet. The POP—and thus, each of the wireless networks 16—necessarily has a unique Internet Protocol (IP) address and may have a plurality of unique IP addresses. The IP address may be a publicly routable IP address or may be translated using Network Address Translation (NAT).

The wireless networks 16 include at least one access point 18 for transmitting and receiving data from one or more of the user devices 14. The Wi-Fi network 16a includes a transceiver 18a as the access point 18, while the cellular network 16b includes a cellular tower 18b to transmit and receive data. The wireless networks 16 may also include one or more of a router, digital/analog call aggregator, server, and frame relays or Asynchronous Transfer Mode (ATM) switches. The wireless networks 16 are typically maintained by one or more service provider 20, such as, Provider A 20*a* in the Wi-Fi network 16*a* and Provider B 20*b* in the cellular network 16*b*. The access points 18 connect user devices 14 to other devices, services, and users by serving as the point of interconnection between the wireless networks 16 and a network 28, which may be a fixed wireline network. Alternatively, the wireless networks 16 may interconnect to one or more other wireless and/or wireline network.

Once a user device 14 has connected to the wireless network 16, the user has access to the available devices, services, and users linked to the network 28. For example, the user device may have access to the user's user network 30, which may be, for example, the user's home or work network. The user network 20 may include a server 34 in communication with a database 38 and a computer 42 or other device. The user device 14 is able to transmit and received data from the user network 30 via the wireless connection.

A third-party provider 50 may also be in communication with the network 28. The third-party provider 50 may, for example, be the entity that provides individuals and other ISP companies access to the Internet, such as an Internet Access Provider (IAP). An IAP is a type of Internet Service Provider (ISP) that has the equipment and the telecommunication line access required to have one of more POP on the Internet for the geographic area served. The larger IAPs have their own high-speed leased lines so that they are less dependent on the telecommunication providers and can provide better service to their customers. The third-party provider 50 typically has at least one server 54 in communication with one or more database 58. The database 58 may, for example, contain user information such as usernames, passwords, privileges, etc.

Figure 2:
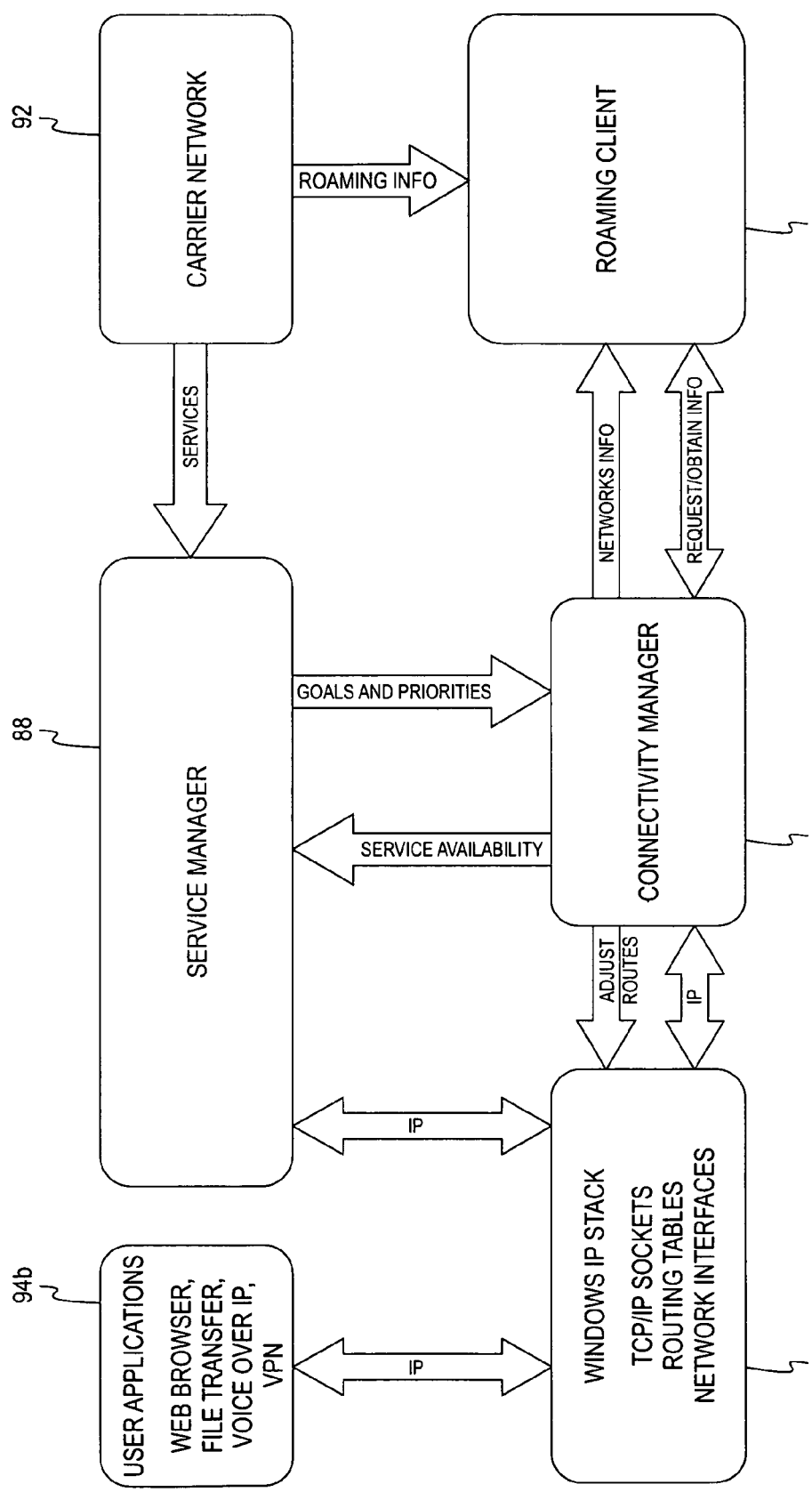
FIG. 2 is a schematic representation of the mobile-connectivity application of FIG. 1.

Turning also to FIG. 2, the mobile-connectivity application 10 illustrated in FIG. 1 will be further detailed. The mobile-connectivity application 10 is located on a user device 14 and is composed of a roaming client 80, a connectivity manager 84, and a service manager 88. The roaming client 80 determines what networks are available, such as wireless networks 16, the location(s) for the available networks, and the resources required to connect to the available networks. Additionally, the roaming client 80 analyses and applies roaming priorities and automatic hand-offs based on such criteria as, for example, speed, cost, and user preferences. The connectivity manager 84 allows the user to add new foreign networks and access links and applications if the user device 14 is in a location not recognized by the roaming client 80. The connectivity manager 84 helps to ensures smooth hand-offs as the user device 14 travels from wireless network to wireless network.

The connectivity manager 84 acts as a routing watchdog to enforce proper traffic routing according to a user's preference. When changes in connectivity occur, (e.g., dial-up, change of SSID, LAN connected, etc.) the user's operating system recreates routing entries to the best of its abilities. At the same time, other software, such as VPNs, are also configuring and changing traffic redirection. The connectivity manager 84 detects these changes and repairs the routing tables in a minimalist way.

The service manager 88 is the layer in the mobile-connectivity application 10 that handles external applications that are connection-sensitive. When a connection is first established, the service manager 88 will start all pertinent applications automatically. If roaming or any other connectivity-changing event causes the user device 14 to change local IP address, the service manager 88 can restart external systems (such as VPNs). Restarting a service can be done either by stopping it and the starting it again or, in the case of integrated services supporting that function directly, by sending the appropriate "restart" command to the service (e.g., process, DLL, ActiveX control, etc.).

Furthermore, a "Service" can be defined to be only available on a certain interface. A good example would be a supplier-specific application running only on the GPRS network. When the user requires the "Service," the service manager 88 will make sure the modem is up and that the service-specific traffic goes through the GPRS link. A service can be accompanied by goals and priorities. For example, if an application requires a specific server to be up and running (goal), then the service manager 88 can "sense" the presence of the server before it launches the service. This is very useful for Intranet applications or applications limited to access from within the ISP network (e.g., SMTP servers are frequently protected from access from the global Internet). If multiple services are in contention for specific resources, priorities can be used to make sure devices are used for the most important services or the most pertinent at the given time. For example, a Telnet session might be dropped if maintaining it requires shutting down an FTP transfer.

The roaming client 80 and connectivity manager 84 request and provide information to each other. Information, as used herein, is defined as data that has been processed into some context to yield a meaningful result to the receiver. The connectivity manager 84 provides network information to the roaming client 80 as well as providing service availability information to the service manager 88. The service manager 88 provides goals and priorities information to the connectivity manager 84.

The mobile-connectivity application 10 is in communication with a plurality of databases and other components and applications. In the illustrated example, the mobile-connectivity application 10 is in communication with a carrier network 92, windows module 94, that includes a windows IP stack 94*a*, and other user applications 94*b*. The carrier network 92 includes various databases and components that provide the mobile-connectivity application 10 with the required dialers (e.g., PPPoE, L2TP, CDMA, etc.), network databases (e.g., SSID, network prefixes, etc.), integrated services, customer branding, etc. The carrier network 92 provides dialers and network databases to the roaming client 80 that utilizes this data to determine the resources required to connect to the available networks. The carrier network 92 communicates the integrated services and customer branding to the service manager 88 that utilizes this information to provide additional functionality, offered by the carrier, to the user.

The windows IP stack 94*a* includes the various sockets, routing tables, network interfaces, drivers, etc., provided with the windows operating system and with third-party hardware and software. The windows IP stack 94*a* and the connectivity manager 84 communicate Internet Protocol (IP) information to each other. The connectivity manager 84 also communicates with the windows IP stack 94*a* to adjust the routes used by windows to, as will be detailed further below, provide connectivity to third-party protocol clients implemented in a way not recognizable directly by the operating system (such as most VPNs). The windows IP stack 94*a* also communicates and receives IP information from both the service manager 88 and the user applications 94*b*.

Figure 3:
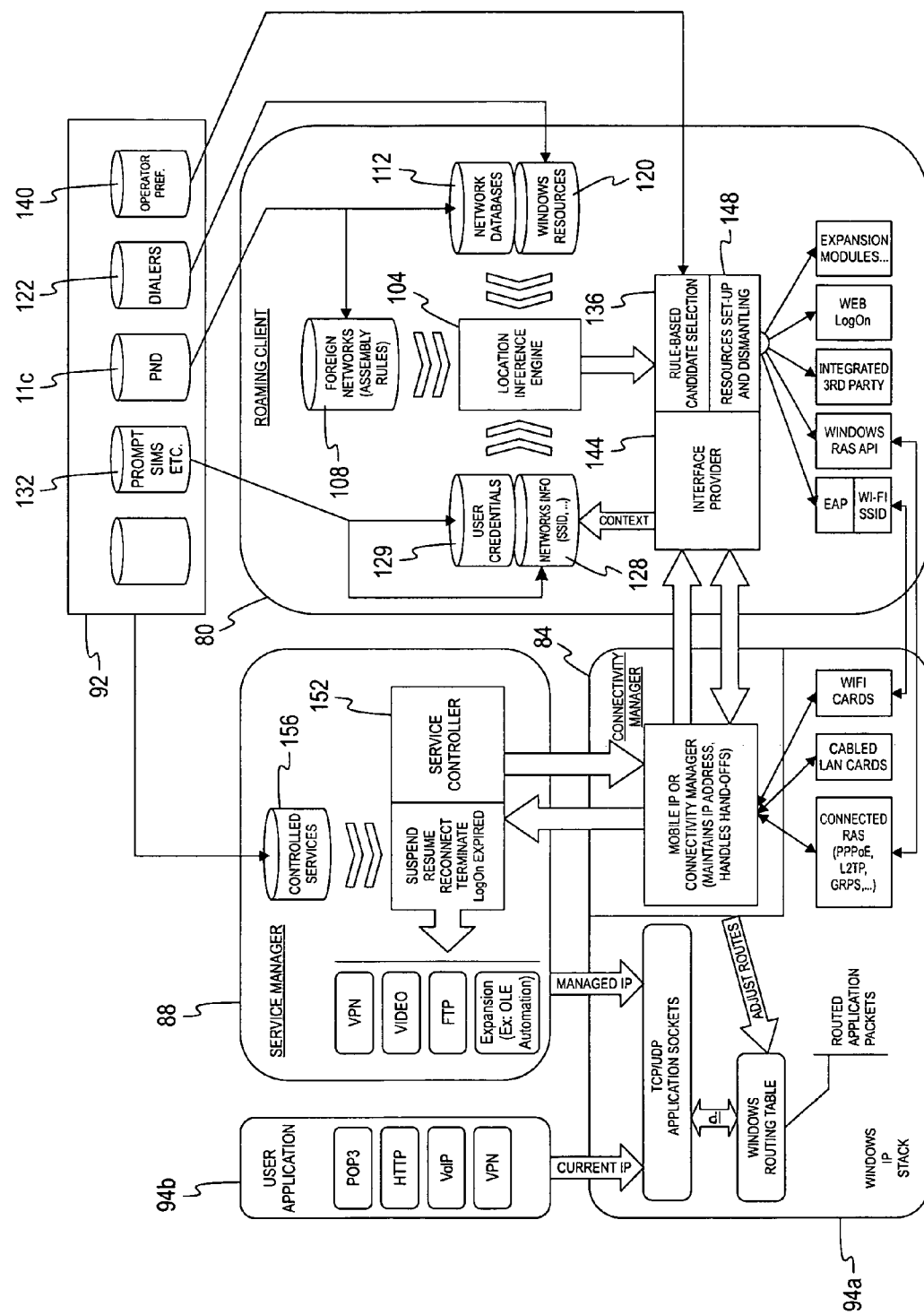
FIG. 3 is another schematic representation of the mobile-connectivity application of FIG. 1.

Referring also to FIG. 3, the mobile-connectivity application 10 described above will be further detailed. The roaming client 80 includes a location inference engine 104 for electing candidate networks that the user device 14 may connect to. As illustrated, the location inference engine 104 receives data from a plurality of databases located on the user device 14, though it should be understood that a single database containing all of the required data may be utilized. The location inference engine 104 receives assembly rules for establishing a connection to an unknown network from a foreign networks database 108, while connection information for recognized networks is provided by a networks database 112. The foreign networks database 108 feeds the location inference engine 104 with "service blocks" that can be utilized by the location inference engine 104 to create the required login procedure for a foreign network. The service blocks can then be combined in a variety of ways until the proper login procedure for the foreign network is determined. Alternatively, where a network is recognized (from a prior connection on the user device or carrier provided information), the data within the networks database 108 associates the recognized network directly with the required login procedure for that network.

A "foreign network" is a combination of connectivity resources, authentication resources, and special instructions to enhance roaming. As such, a foreign network can be thought of as a definition used by the location inference engine 104 to assemble the appropriate resources (dialers, passwords, etc.) to connect to a specific network.

Both the foreign networks database 108 and the networks database 112 are populated with data from a Preconfigured Networks and Databases (PND) database 116 located on the carrier network. The PND database 116 provides connection information directly from the carrier to the databases 108, 112 on the user device 14. This information can then be utilized by the location inference engine 104 to determine the connection information for the located network(s).

A windows-resources database 120 provides the location inference engine 104 with data as to what resources are available on the user device 14. This data provides the location inference engine 104 with information as to the available resources that are necessary to connect to the located network. The windows-resources database 120 includes data that has been provided by a preconfigured-dialers database 122 provided on the carrier network 92.

Diallers can be very complex to program, especially when they are using non-default options (e.g., LCP options, security parameters, etc.). Windows has no mechanisms to export/import dialler definitions, especially since they are based on locally installed devices. To further complicate matters, each version and sub-version of Windows have peculiarities so the process of exporting/importing becomes more a question of retracing the pertinent information and then finding a way to remap it correctly on the destination machine. This includes finding out the right device to use (e.g., CDMA, GPRS, Dial-Up, PPPoE, etc.). The mobile-connectivity application 10 allows an operator to "export" a preconfigured definition of a dialler from one of their working computers and ship it—utilizing the mobile-connectivity application 10 (or through an update package)—to the end-user's computer.

A user-credentials database 124 provides security info (e.g., usernames, passwords, WEP keys, certificates information, etc.) to the location inference engine 104. The user-credentials database 124 is populated with data by from a carrier, which can be stored and transferred from a user-credentials and authentication database 132 located on the carrier network 92. The user-credentials database 124 provides a complex hierarchical means for remembering security information. A typical search is performed by determining the MAC-address, the SSID or the network prefix, the network database, and the preconfigured diallers. The credentials can be set to be always prompted, wherein they are stored on and retrieved from a disk or database, or can be set to be used only for the current session. A networks-information database 128 provides the location inference engine 104 with information about the located network, such as the SSID for the access point 18. The networks-information database 128 is also populated with data from the carrier. It should be noted that the information provided from the carrier can be provided from a database on the carrier network 92 or may be provided to the mobile-connectivity application 10 from the carrier by other means.

The user-credentials database 124 provides convenient functionality to the user. For example, take the case of a user that is roaming in a Wi-Fi hotspot requiring Point-to-Point Protocol over Ethernet (PPPoE) authentication necessitating the user to enter username/password credentials unique to that specific location. The mobile-connectivity application 10 allows the user's carrier to pre-configure a foreign network for the user. Upon recognizing the location's SSID and referring to a locally stored database, the location inference engine 104 assembles the appropriate resources to dial and authenticate with the PPPoE server using the correct user name and password.

The database records are associated with MAC addresses and/or SSIDs and can supply the type of additional resources required and potential overrides for phone numbers, user names, and passwords. The database records can be as general as defining a generic dialer that prompts the user for a username and password, or as specific as to associate with a specific SSID (or MAC address) a username and password that is unique for the particular access point 18. One benefit of this system is that the carrier can guide their subscribers onto the networks of the carrier's choice by providing, via databases, the information the carrier desires.

In addition to storing user credentials, the user-credentials database 124 also allows the operator to program the mobile-connectivity application 10 to prompt the user for a user name and password when a specific network is encountered. Returning to the above example, it is possible that the PPPoE credentials for the subscriber is only available using a "scratch card" that the user receives at the particular hotspot. Fully aware of this, the carrier may configure the mobile-connectivity application 10 to prompt the user for the PPPoE credentials when the user first enters this hotspot requiring their username and password. Once the user credentials are submitted—according to the login credentials acquired at the hotspot—the credentials can be stored in the user-credentials database 124. Once this occurs, the user should not be required to re-enter their credentials information during each subsequent login.

Thus, the mobile-connectivity application 10 removes the confusion and responsibility from end-users and enables them to become truly mobile. The mobile-connectivity application 10 addresses this issue by allowing for carrier-provided databases within the carrier network 92 that provide the user with a listing of Hotspots based on different foreign network definitions.

Utilizing the data obtained from the various databases, the location inference engine 104 determines a list of candidate networks by associating the available networks with the networks' connection information. The location inference engine 104 then provides the determined candidate networks to a rule-based candidate selector 136.

The rule-based candidate selector 136 receives the information for the location inference engine 104 and applies rules provided by the carrier and the user. The carrier-provided rules are provided via an operator-preferences database 140 maintained on the carrier network 92. The operator-preferences database 140 may provide the data to a local database (not shown) on the user device 14 that may then feed to rules to the rule-based candidate selector 136.

Initially, the rules available to the rule-based candidate selector 136 are provided by the carrier and thus, the initial configuration of the roaming client 80 is made by the carrier. The user can then change the configuration via a plurality of user-selectable options that can be prioritized to adjust the rules to the user's preferences. For example, the user may prioritize the various options as, ignore, tie-breaker, medium important, important, very important, and absolute. These priorities can be assigned to each of a plurality of user-selectable options, such as, for example, speed of network, level of security of network, interface type, signal strength, plan coverage, user preference, avoid switching, punish failures, punish prompts, previous visits, etc. These various options will be explained in greater detail below with respect to FIG. 6.

The rule-based candidate selector 136 is a trainable, learning artificial intelligence that is capable of learning and adapting to user or carrier selections. The rule-based candidate selector 136 automatically adapts over time to the user's preferences as the user continues to configure the roaming client 80 in various connectivity situations. To assist in training the rule-based candidate selector 136, hypothetical connection situations may be presented to the user. Additionally, real-time possibilities and selections may be utilized to train the rule-based candidate selector 136. For example, if a user decides to pick from a plurality of available networks, and the rule-based candidate selector 136 would have selected a network different from the one the user selects, the rule-based candidate selector 136 may query the user—utilizing a plurality of objective questions—as to why the user made their particular selection.

Once the rule-based candidate selector 136 has assigned a priority to the candidate networks, this information is provided to an interface provider 144. The interface provider 144 controls at least a portion of the roaming process. The interface provider 144 receives requests from the lower layers of the mobile-connectivity application 10, feeds the information back inside the roaming client 80, and then translates the results from the higher-level functions (e.g., rule-based selection, location inference engine, etc.) into low-level information. For example, if a network requires multiple dialling, only the pertinent operating system resource(s) should be used by the drivers and the interface provider 144 is responsible for determining and implementing the appropriate one(s). The interface provider 144 is in communication with a resources module 148 that is adapted to setup and configure, as well as dismantle, the various resource(s) required by the interface provider 144. The resources module 148 is designed to access the resources, modules, and similar functionality provided on the user device 14.

The interface provider 144 is also configured to provide information to, and obtain information from, the connectivity manager 84. As discussed above, the connectivity manager 84 interacts with the roaming client 80, the service manager 88, and the windows IP stack 94a to establish connections to the carrier networks utilizing service blocks to build the necessary connections. The connectivity manager 84 continuously scans for additional networks available to the user device as well as determines whether previously located networks remain available to the device. In addition, the connectivity manager 84 monitors the interfaces provided by the interface provider 144 by pinging them (using various apparatus including, but not limited to, ICMP, UDP, and TCP messages) to determine that the interface exists and can accept requests. The monitoring of the interfaces allows the mobile-connectivity application 10 to determine that a particular host is operational and also the time required to receive a response from the host.

The connectivity manager 84 is also in direct communication with the service controller 152 of the service manager 88. The service controller 152 monitors the current networking conditions provided by the connectivity manager 84 and ensures that they satisfy any pre-conditions for a particular service. The service controller 152 then determines which services should be running at any given time. The service controller 152 also makes decisions based on switching, availability of servers (for intranet applications), level of security, and other service-specific predicates. The service controller 152 uses different technology for each service type such as simple program launching and monitoring, window content analysis, OLE Automation, ActiveX, etc.

The service controller 152 is in communication with a controlled-services database 156 that includes all the services that were pre-configured by a carrier or an IT department and that were "tailored" for the local computer. The preconfigured services stored in the controlled-services database 156 are often generic (such as "Automatic VPN") and are tailored by utilizing the user device's 14 actual configuration (which then becomes "Automatic VPN using profile Mine from Vendor XYZ VPN Client"). The controlled-services database 156 also includes any additional service specified by the end user (such as starting Outlook). The preconfigured services can be supplied by a carrier and or an IT department on installation and/or through regular configuration updates.

Figure 4A:
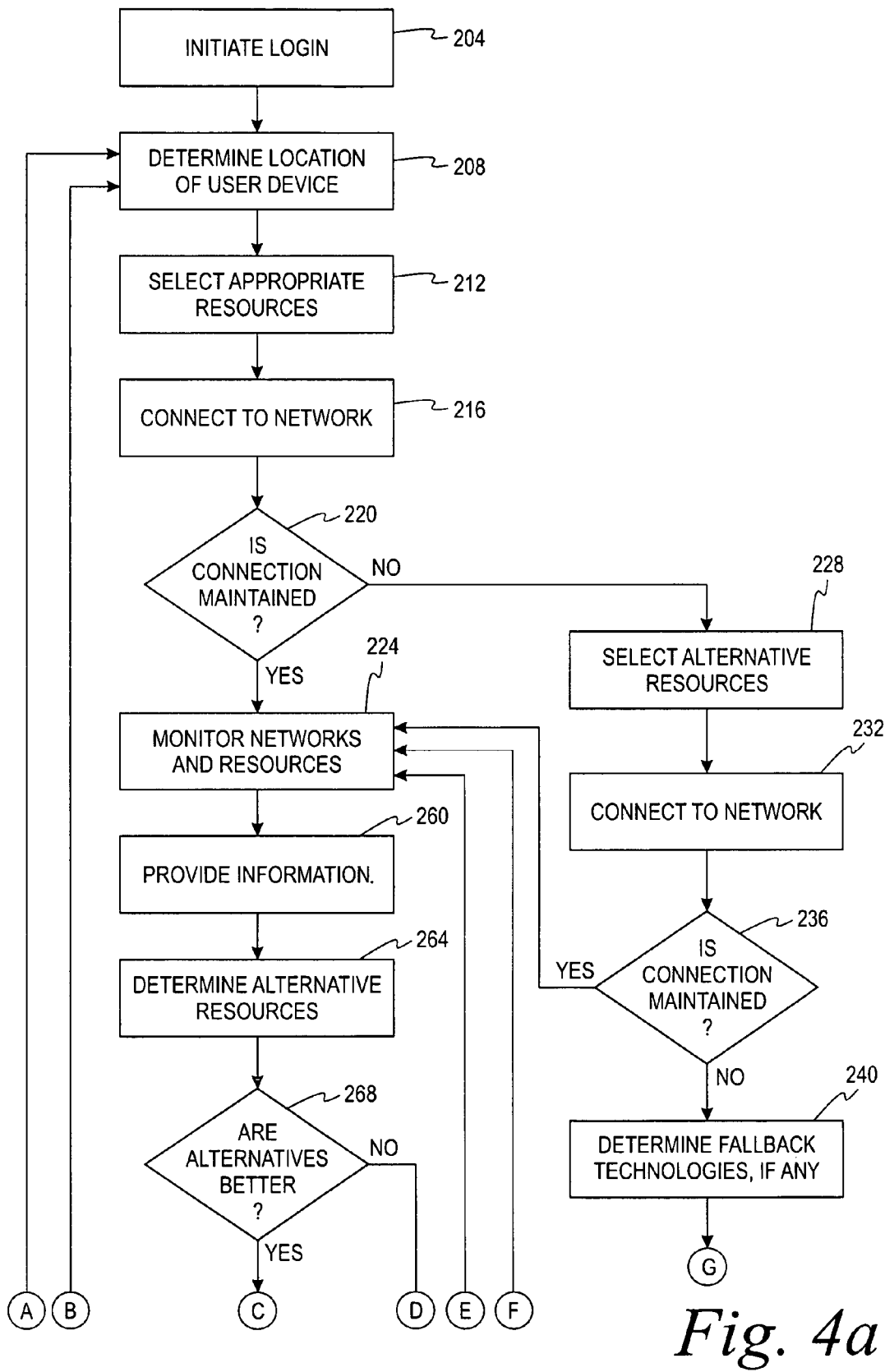
FIGS. 4a-b illustrate a method for connecting a user device to a wireless network according to one embodiment.
Figure 4B:
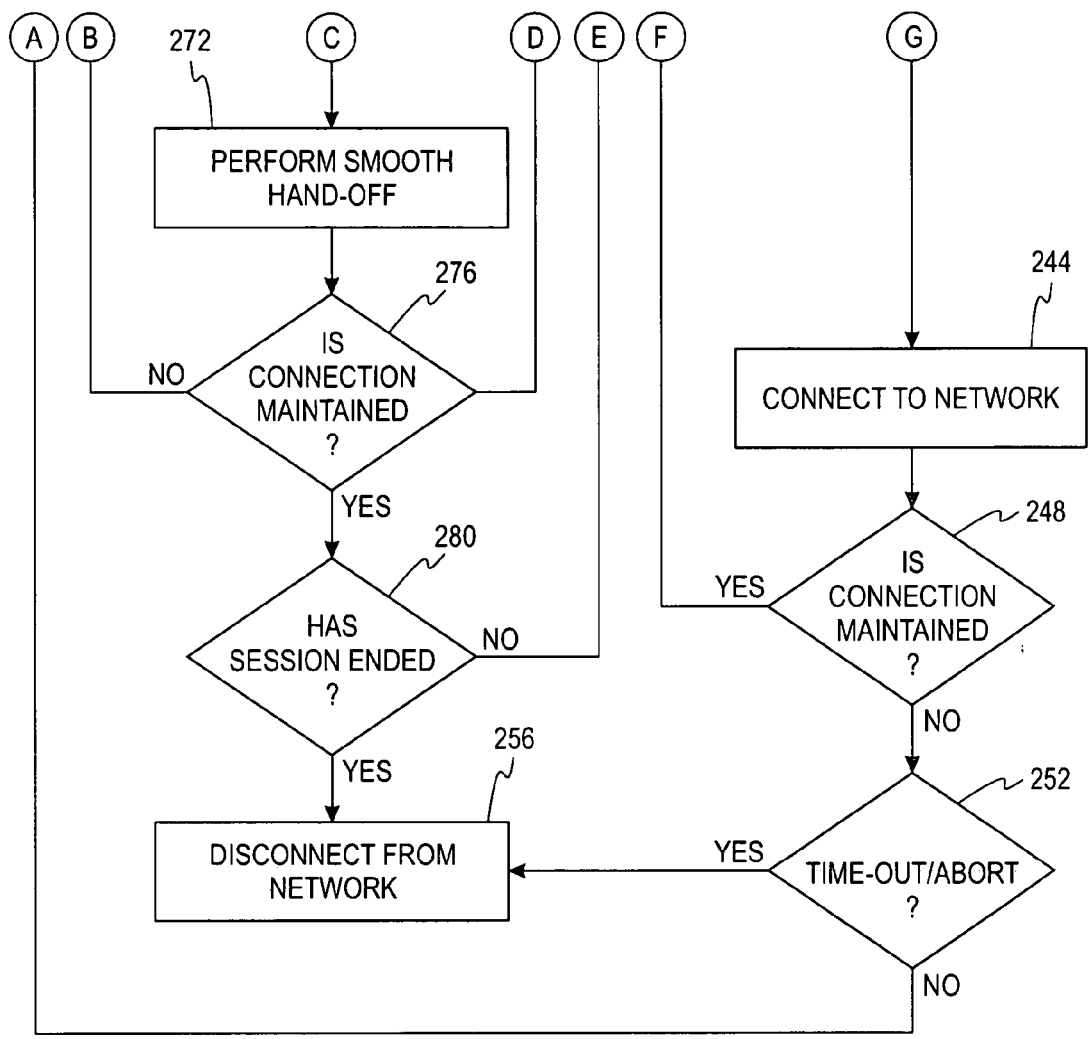

Referring now to FIGS. 4a-b, a method for connecting a user device 14 to a wireless network 16 will be illustrated, according to one embodiment of the present invention. FIGS. 4a-b generally illustrates the procedure for logging into a network on a user device 14. At step 204, a user attempts to log in to a network connection by initiating a log in procedure. The location inference engine 104 of the mobile-connectivity application 10 determines the location of the user device at a step 208 and the networks available to the user device 14. The roaming client 80 then, at step 212, selects the appropriate resources for logging in to the available networks. Once the appropriate resources have been selected, the connectivity manager 84 attempts to connect, at step 216, to one of the located networks utilizing the selected resources. A determination is made at decision box 220 as to whether a connection is maintained to the network. If the connection is maintained, the connectivity manager 84 continues to monitor the available connections and resources at step 224. If, however, a connection is not maintained, the roaming client 84 selects alternative resources and provides this information to the connection manager 84 at step 228.

At step 232 the connectivity manager 84 attempts to connect to a second one of the located networks using the alternative resources provided. A determination is made at decision box 236 as to whether a connection is maintained to the network. If the connection is maintained, the connectivity manager 84 continues to monitor the available connections and resources at step 224. If, however, a connection is not maintained, the roaming client 84 determines whether any fallback technologies (e.g., dial-up, etc.) are available to the user device 14 at step 240.

At step 244 the connectivity manager 84 attempts to connect to one of the located fallback technologies. A determination is made at decision box 248 as to whether a connection is maintained to the network. If the connection is maintained, the connectivity manager 84 continues to monitor the available connections and resources at step 224. If, however, a connection is not maintained, the mobile-connectivity application 10 determines whether a an abort command has been received or a predetermined timeout has been surpassed, at step 252. If so, the mobile-connectivity application 10 exits at step 256. If not, the location of the user device is redetermined at step 208.

As discussed above, once a connection is maintained, the connectivity manager 84 monitors the alternative networks and resources available to the user device 14. This information is provided to the roaming client 80 at step 260 and the roaming client 80 configures the necessary resources at step 264. The roaming client 80 then determines, at decision box 276, whether the alternative networks are better than the current connection by analyzing the current and available connections by applying rules using the rule-based candidate selector 136. If an alternative network would be better, the connectivity manager 84 performs a smooth handoff at step 272. If the alternative network(s) would not be better—or after the smooth handoff is made—a determination is made at decision box 276 as to whether the connection is maintained. If the connection is not maintained, the location of the user device is redetermined at step 208. If the connection is maintained, the determination is made as to whether the session has ended at decision box 280. Where the session has ended, the user device 14 is disconnected from the network by the mobile-connectivity application 10 at step 256. Where the session remains active, the connectivity manager 84 monitors the alternative networks and resources available to the user device 14 at step 224.

Referring now to FIGS. 5-8, the operation of the mobile connectivity system 10 is illustrated, according to one embodiment of the present invention. It should be noted that although FIGS. 5-8 are presented as sequential, the implementation is asynchronous and follows the blackboard model. The basic design includes a blackboard, knowledge sources (KS), and a control mechanism. The blackboard is usually a global database that is the working space for the KS to read and write information to. The KS specialize in a specific area and can be procedures, sets of rules, or logic assertions. The control mechanism monitors the KS and the actives of the blackboard. The flexibility of the blackboard model allows independent modules to be added, updated, or removed without recoding the whole model. Modules can perform independent task and can be tailored to needs upon execution.

Figure 5:
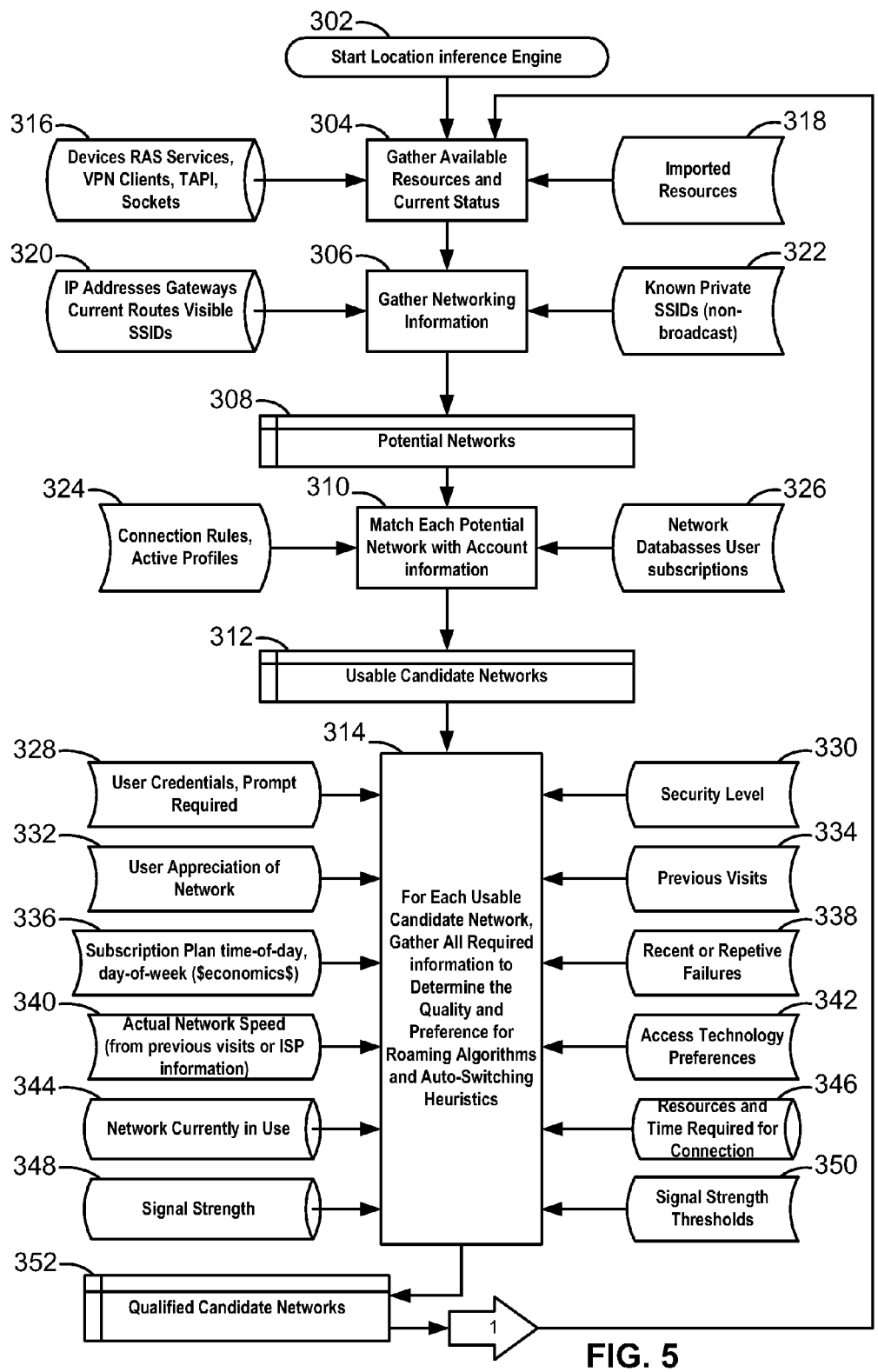
FIGS. 5-8 are flow charts illustrating the asynchronous operation of the mobile connectivity application of FIG. 1, according to one embodiment of the present invention.

As illustrated in FIG. 5, the location inference engine 104 is started at 302. The location inference engine 104 gathers the available resources as well as the current status data at 304 by collecting resources at 318 from the various databases associated with the roaming client 80 coming either from the carrier network or from accumulated information as the user moves from network to network, and from live external information at 316, such as devices, sockets, etc. The mobile-connectivity application 10 is equipped with small software agents that take charge of the specific technologies external to the mobile-connectivity application 10. However, these agents behave on the surface as if they are a single block and perform their various functions individually from the other agents.

For example, these agents may extract relevant information from the operating system (or other appropriate source of the information) for the first time and publish this information for consuming agents. The agents may also install appropriate hooks for operating system notifications and unless prohibitive, prepare for regular automatic polling and manual refreshing. A "blocking interval" is provided to avoid modules being unaware of each other and requesting polling too close together or simultaneously. These agents also perform configuration differential analysis and do not simply "dump" the new information. In addition, specific "type" changes are identified the help prevent or inhibit small and irrelevant changes in the internal states of the operating system from causing a cascade or algorithms and heuristics to fire pointlessly.

The location inference engine 104 also gathers networking information at 306 from known MAC addresses and SSID's at 322 contained within the networks information database 128 within the roaming client 80. The location inference engine 104 is provided a list of the connectivity-capable elements from within the mobile-connectivity application 10. Real-time network information is also obtained at 320, for example, for visible SSID's per-WiFi interface, interface sates and IP information, routing tables, and other managed devices, which may include the signal strength, selected networks, and available networks for the managed devices. Utilizing this data, the location inference engine 104 determines potential networks available to the user device 14 at 308 and attempts to match the potential networks with the user's account information at 310 by searching the network database 112 at 326 and the user-credentials database 124. With this information the location inference engine 104 determines the usable candidate networks at 312 and gathers all the required information to determine the quality, preferences for roaming algorithms, and auto-switching heuristics at 314.

For each usable candidate network, the mobile-connectivity application 10 gathers information at 314 that will after be used by the connection selection heuristics and algorithms. Also, certain factors are normalized across technology and equipment. For example, Wi-Fi signal strength cannot be directly compared or used alongside the values returned by, for example, a cellular data card. All values are therefore turned into a "signal strength bars" subjective system.

To obtain the desired information at 314 the location inference engine 104 communicates with the various databases within the roaming client 80 at 328, 330, 332, 334, 336, 338, 340, 342, and 350 to gather the necessary information. The one or more databases contain information regarding, for example, the subscription information (user credentials), WEP keys, security level (defined by database or inferred from technology utilized in connection), user appreciation of the network, previous visit information, success/failure rates from prior visits, subscription plan, repetitive failures, user technology preferences, programmed signal strength thresholds to avoid, etc. The location inference engine 104 also determines the currently used network at 344, the resources and time required for the connection at 346, and the current signal strength 348 using real-time information external to the mobile connectivity manager 10. Utilizing this information the location inference engine 104 is able to determine the qualified candidate networks at 352 and these networks are communicated to the rule-based candidate selector 136. Once networks have been qualified the location inference engine 104 supplies this information to the rule-based candidate selector 136 that can then start or react to changes in ratings or availability.

Figure 6:
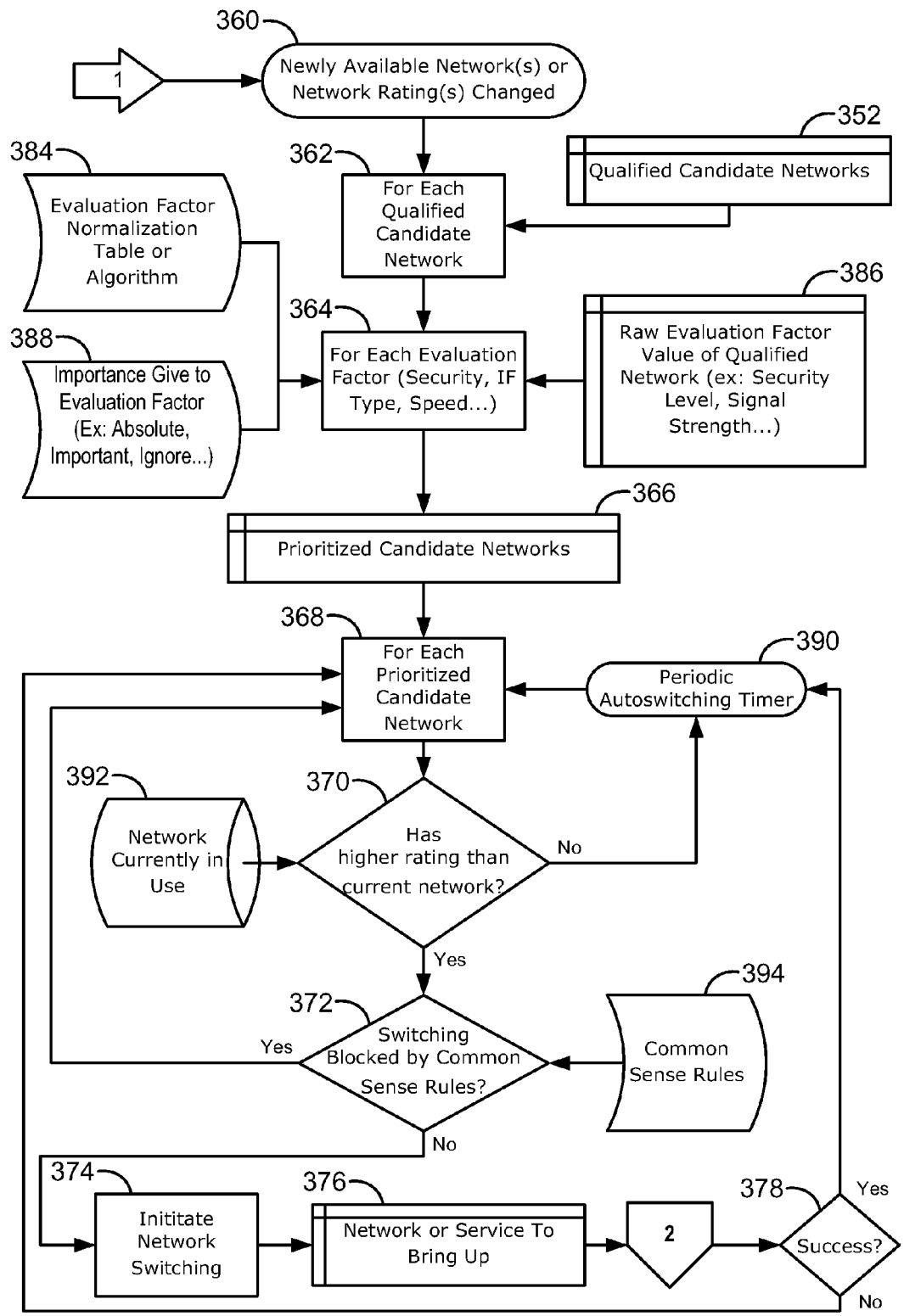

Referring also to FIG. 6, the rule-based candidate selector 136 determines whether any of the qualified networks are newly available or whether the network rating(s) has changed at 360. Each of the newly-available networks and qualified candidate networks are evaluated by the rule-based candidate selector 136 at 364 based on a variety of priorities at 364 that have been user assigned or learned by the mobile-connectivity application 10. The rule-based candidate selector 136 looks at various evaluation factors contained in a normalization table or algorithm at 384 and the importance given to each of these factors at 388. An example of the evaluation factors (e.g., autoswitching rules) that can be used to establish network priorities include, but are not limited to, interface type, plan coverage, security, user preference, avoid switching, network speed, punish failures, and punish prompts. In addition, a raw evaluation factor value is provided to the rule-based candidate selector 136 from the location inference engine 104 that was generated while the information required to evaluate the quality of the candidate network was collected at 314 (FIG. 5).

According to one embodiment of the present invention, the interface type and network speed is a preset factor that ranks the importance of one of the supported interface types (e.g., wireline, WiFi, cellular, etc.) and the current or expected speed of the network. The plan coverage is assigned on a per-network basis and ranks the type of roaming plan the user has with a specific foreign network. Security is a preconfigured definition that is based on the connectivity pattern used by the foreign network and that is ranked by the expected security provided by the network. User preference is a ranking of the importance of a user's input preferences in comparison with the other factors. The punish failures and punish prompts factors are used to raise or lower the priority for foreign networks that fail to connect or do not currently have the required user credentials, respectively. The avoid switching factor ranks the importance to give to a foreign network that is currently providing service to the user device 14. The mobile-connectivity application 10 can assign a higher priority to the network that is currently in service to prevent switching from network to network too often, as will be discussed below.

These autoswitching rules help to determine which of the candidate networks is the most favorable to connect with. Each of the above factors is provided an importance level as configured by the software provider, service provider, and/or end user. In one embodiment, the importance levels range from "ignore" to "absolute" with intermediate steps such as "tie breaker," "important," and "very important."

When a user chooses to allow the mobile connectivity application to autoswitch from network to network, the mobile-connectivity application 10 will connect to the most favorable available network at any given moment unless other overriding conditions are met. When autoswitching is disabled, the mobile-connectivity application 10 will still attempt to connect to the most favorable of the candidate networks but, so as long as it maintains a connection, the mobile-connectivity application 10 will not switch to another of the networks, even if a better candidate network subsequently becomes available.

Referring still to FIG. 6, the above evaluation factors and the importance associated therewith are utilized by the rule-based candidate selector 136 to supply the list of sorted prioritized candidate networks at 366. For each prioritized network (368), the rule-based candidate selector 136 determines at 320 whether the prioritized network has a higher rating (computed at 364) than the connected network by looking at the real-time statistics associated with the connected network at 392.

If at 370 a determination is made that the prioritized network is not higher rated, the search ends—since the remaining sorted prioritized networks are necessarily of lower rating—until such time as there are changes in candidate networks availability, candidate networks ratings, or the periodic autoswitching timer is triggered.

If at 370 a determination is made that the prioritized network is higher rated than the connected network, the rule-based candidate selector 136 determines at 372 whether switching is blocked by common-sense rules at 394 that are provided within the mobile-connectivity application 10. The common sense rules are typically defined to avoid loss of service caused by switching within the same technology or by the fact that the current network is using devices also required for the potential candidate. If the switching is blocked at 372, the search continues with the next prioritized candidate network at 366. If there are no more prioritized candidate networks left to evaluate, the search stops until such time as there are changes in candidate networks availability, candidate networks ratings, or the periodic autoswitching timer is triggered.

If, however, the switching is not blocked, the rule-based candidate selector 136 signals the mobile-connectivity application 10 to initiate a network switch at 374. The mobile-connectivity application 10 then begins the process of connecting with the selected network and/or service at 376 as will be explained in greater detail with respect to FIGS. 7-8. Once the mobile-connectivity application 10 has attempted to bring up the new network and/or service, the determination is made at 378 whether the switch was a success.

If the switch is successful, the algorithm stops until triggered again. If the switch fails, the algorithm resumes at the point when the candidate network was identified. The above-described process can be triggered by two type of events: (1) changes in network priorities at 366 (e.g., new interfaces, status changes, preferences changes, user initiated switching, etc.); and (2) a periodic timer at 390 that signals the rule-based candidate selector 136 to attempt an autoswitch again.

Figure 7:
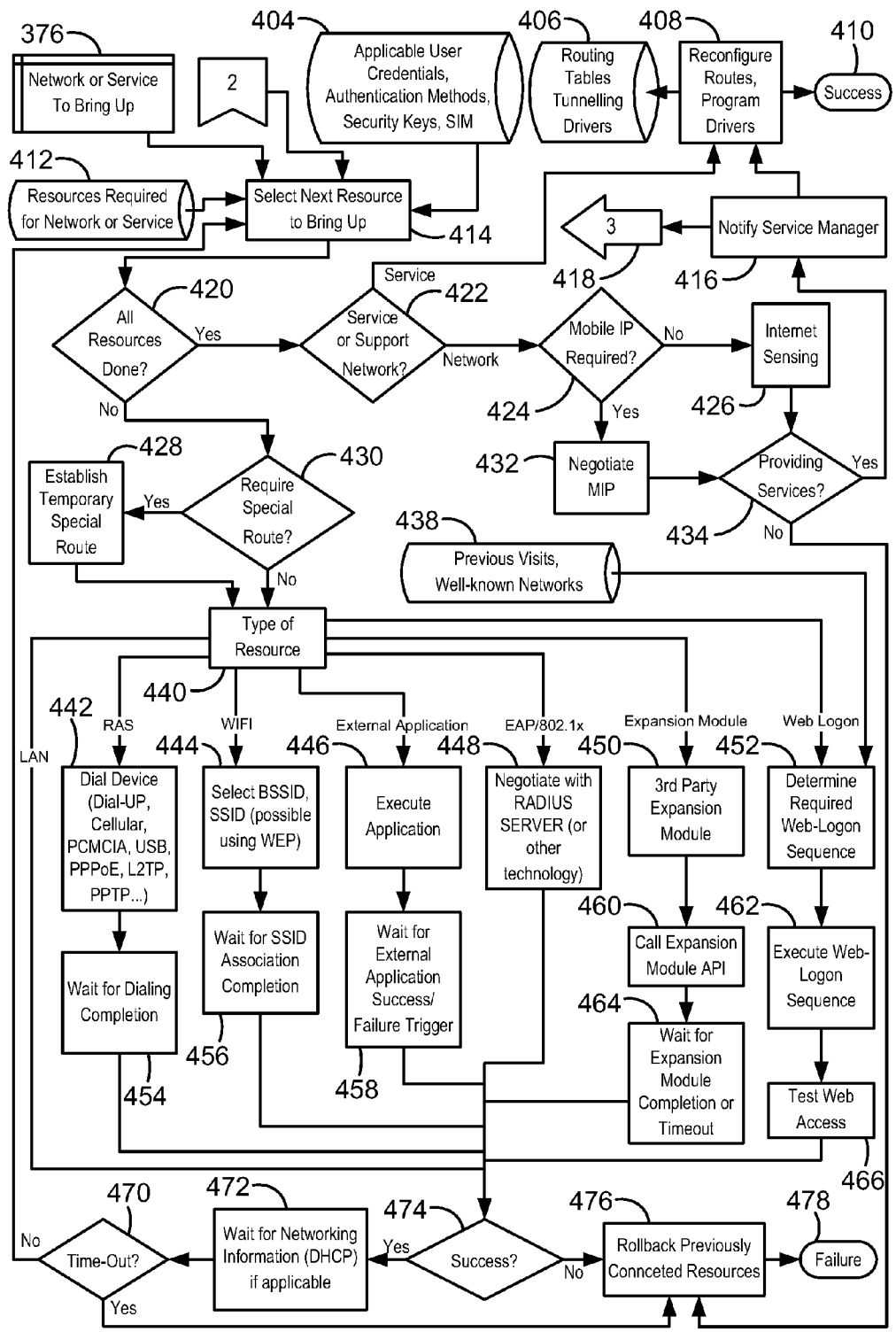

When a candidate network access point or a service is required, the appropriate resources are assembled and connected via the mobile-connectivity application 10. Referring now to FIG. 7, the connection to a network or service using service blocks will be explained in greater detail. A candidate network is identified by the rule-based candidate selector 136 at 376 and is supplied to the interface provider 144. The interface provider 144 selects the necessary resources at 414 from the resources module 148 at 412 as well as other necessary information at 404 from the databases within the roaming client 80. A determination is made at 420 that all of the necessary resources have been assembled. If the necessary resources have not been assembled a determination is made at 430 as to whether a special route is needed and if so, a temporary special route is established at 428.

Certain types of service blocks require dialogue with the external world. In order to avoid switching all the traffic to the candidate network for those negotiations, the service blocks can request temporary special routes to support their authentication/connection mechanisms. The exact process varies greatly from one type of service block to another (from RAS dialing, Wi-Fi associations to execution of 3rd party software). As a general rule, service blocks offer the following minimal asynchronous mechanisms: (1) a means to determine if the resource is up or down; (2) a means to request for the resource to be brought up; (3) a means to tear down the connection (unless the service block is said to be "permanent"); and (4) a means to report on status change.

Once the special route has been established or if a special route is not required, a determination is made at 440 as to the type of resource that is still required. The resource can be, for example, a LAN, RAS, WiFi, external application, 802.1x, expansion module, web-logon, etc. Where a LAN is utilized a determination is made at 474 as to whether the resources will result in a successful connection being established via LAN.

Remote Access Servers (RAS) is a component of a network infrastructure allowing the negotiation of a session as authorized by a service provider using the user's credentials (typically a user name and a password) When RAS is the resource, a device is dialed at 442 (e.g., such as a cellular modem in the user device 14) and the interface provider 144 waits for the dialing to be completed at 454, at which point a determination is made at 474 as to whether the resources will result in a successful connection being established via RAS.

Where the type of resource is WiFi, a Service Set Identifier (SSID) or a Basic SSID (BSSID) is selected at 444 by Wired Equivalent Privacy (WEP) in some embodiments. The interface provider 144 waits for the association of the SSID or BSSID to complete at 456, at which point a determination is made at 474 as to whether the resources will result in a successful connection being established via WiFi. It should be noted that if the WiFi resource requires Extensible Authentication Protocol (EAP), a 802.1x resource will be dialed after.

When the type of resource is a 802.1x connection, the interface provider 144 negotiates with an authentication server. The authentication server may use the Remote Authentication Dial-In User Service (RADIUS) or the like. When a user device requests access to an access point via a wireless LAN with 802.1x, the access point forces the user (actually, the user's client software) into an unauthorized state that allows the mobile-connectivity application 10 to send only an EAP start message. The access point returns an EAP message requesting the user's identity. The mobile-connectivity application 10 returns the identity, which is then forwarded by the access point to the authentication server, which uses an algorithm to authenticate the user and then returns an accept or reject message back to the access point. Assuming an accept was received, the access point changes the user device's state to authorized and normal traffic can now take place. At this point a determination is made at 474 as to whether the resources will result in a successful connection being established via an 802.1x connection.

When the resource is an expansion module (i.e., a module supplied by a third-party vendor to extend the functionality of the mobile connectivity solution using the mobile connectivity solution's published Application Programming Interface (API)), the interface provider 144 then calls the expansion module's API at 460 and waits for the expansion module to complete or timeout at 464. A determination is made at 474 as to whether the resources will result in a successful connection being established via the expansion module.

When the resource is a web-logon, the interface provider 144 determines the required logon sequence at 452 by searching one of the databases on the roaming client 80 at 438 for prior visit information or other stored network information. The web logon sequence is then executed at 462 and web access is tested at 466. Once web access has been tested, a determination is made at 474 as to whether the resources will result in a successful connection being established via a web logon.

When a determination is made at 474 as to whether the resources will result in a connection being established, a negative result causes the mobile-connectivity application 10 to rollback to the previously connected resources at 476 and results in an autoswitch failure at 478. As such, the mobile-connectivity application 10 will allow the user device 14 to remain on the connected network until a higher rated network is available that the user device 14 can be connected to smoothly. When a candidate network fails to provide full service, the resources allocated by the intermediate steps described above are freed (i.e., disconnected) unless the involved service blocks are specifically instructed to be "permanent." Once the resources are freed (if required), then the rule-based candidate selector 136 is notified of the failure to connect to the candidate network.

Once a service block reports a successful connection at 474, certain types of service blocks also require proper IP connectivity to be established (e.g., Dynamic Host Configuration Protocol "DHCP" information). Thus, when a positive result is achieved, the mobile-connectivity application 10 waits for the necessary networking information (e.g., Dynamic Host Configuration Protocol, etc.), if required at 472. If the information is not received within the service block's natural (standard-based) or programmed time-out at 470, the connection is deemed to have failed and the mobile-connectivity application 10 rolls back to the previously connected resources at 476. If the information is received, the interface provider 144 selects the appropriate resources at 414 and determines at 420 whether all the resources have been assembled.

Once a determination has been made at 420 by the interface provider 144 that all of the resources have been assembled, a determination is made at 422 whether the the service blocks were part of a service offering (such as a VPN) or a support network. If the host is a service as defined by the service manager 88, the routing tables are updated (if required) and a successful connection is established at 410. The reconfiguration information is stored in the routing tables at 406 in one of the databases within the roaming client 80. Alternatively, if the service blocks formed a support network, a determination is made at 424 as to whether mobile Internet Protocol (IP) is required. If mobile IP is not required, the internet is sensed at 426 by the connectivity manager 144. The connectivity manager 144 uses Internet Control Message Protocol (ICMP), User Data Protocol (UDP), and/or Transmission Control Protocol (TCP) packets to test the connectivity to the internet. If mobile IP is required, the connectivity manager 84 negotiates the required protocol.

Once the internet has been sensed or the mobile IP has been negotiated, a determination is made at 434 by the connectivity manager 84 whether the selected network is providing service. If the network is not providing service, the mobile-connectivity application 10 rolls back to the previously connected resources at 476. If the network is providing service, the mobile-connectivity application 10 notifies at 416 the service manager 88 of the connection.

The operation of putting the candidate network into operation depends on the nature of the network itself. For any service requiring routing tables adjustments (e.g., VPN, MIP, Internet Traffic Management, etc.) the appropriate changes are made to the computer's IP stack 94*a*. For protocols such as mobile IP, tunnels are reconfigured to re-route any mobile IP traffic through the newly available network. If the new network is not a "service" from the service manager 88, the service manager 88 is notified that the user device's 14 connectivity has changed. Once the service manager 88 has been notified (if required), then the rule-based candidate selector 136 that requested the connection to the candidate network is notified of the success.

Figure 8:
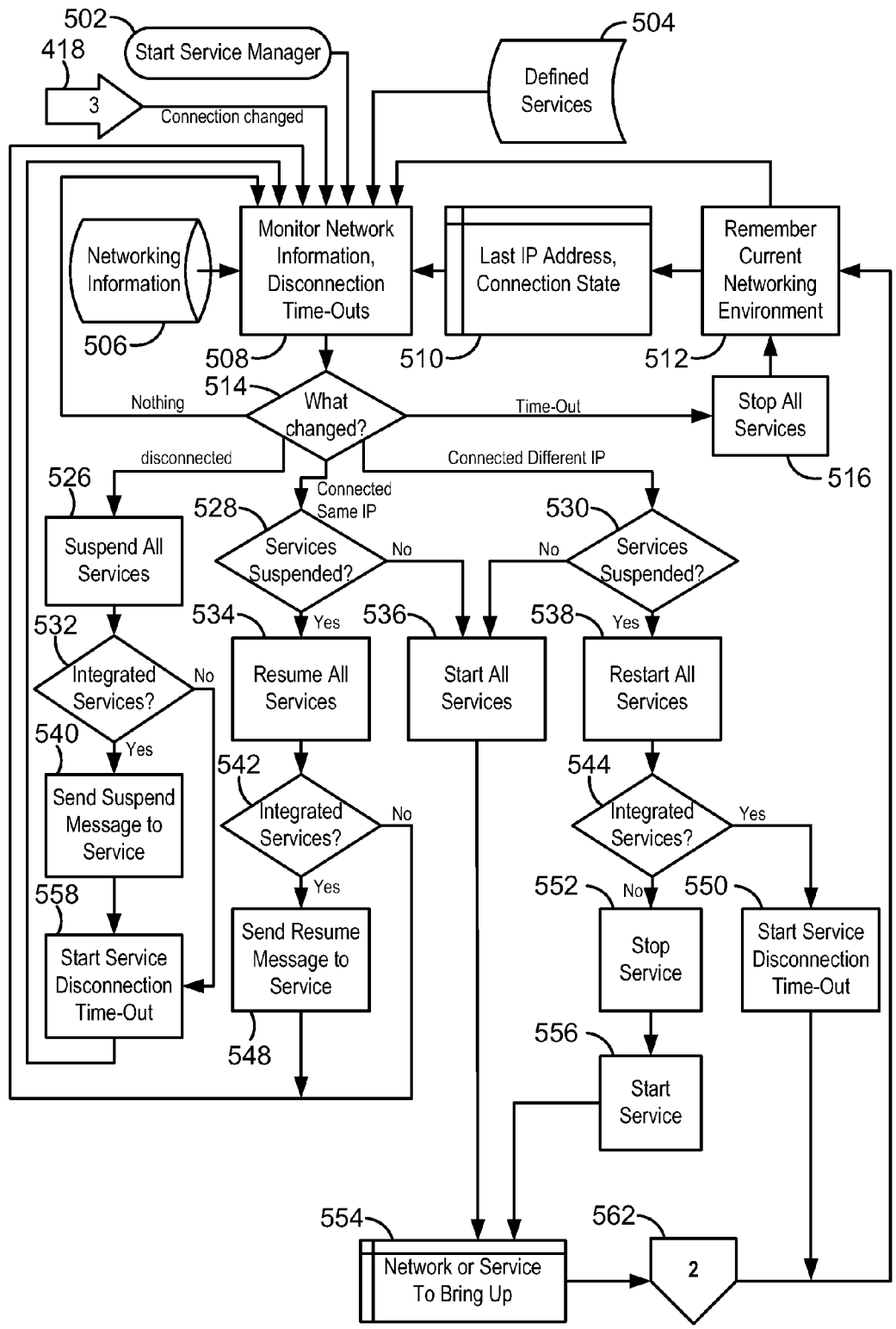

Referring now to FIG. 8, once the service manager 88 has been started at 502, for example, by the notification at 416 (FIG. 7), it monitors the state of the currently selected network and disconnection time-outs at 508 and is fed the real-time networking information at 506. The service manager 88 continuously runs in the background to monitor the situation of the currently selected network and determines what to do according to what has changed. Changes in the connection status are sent from the connectivity manager 84 to the service manager 88 at 418. In addition, data regarding the defined services is fed to the service controller 152 at 504 from the controlled services database 156. The information regarding the connection state and the most recent IP address information is maintained by service controller 152 at 510. A determination is made at 514 as to what, if anything, has changed. If the connection remains, a determination is made at 528 as to whether any of the services to the user have been suspended. If not, all of the services are started at 536 and the service controller 152 brings up the appropriate network or service at 554. If one or more of the services has been suspended, the service controller 152 resumes the services at 534 and determines at 542 whether the service is an integrated service and if so, sends a resume message to the service provider at 548. Once a resume message has been sent, or when the service is found not to be an integrated service, this information in retained by the service manager 88 which continues to monitor that network information at 508.

Alternatively, if a determination is made at 514 that the user device 14 is connected to different IP (or a first-time connection), a determination is made at 530 whether the services have been suspended. If not, the services are all started at 536. If so, the services are all restarted at 538 and a determination is made at 544 as to whether the service is an integrated service. If the service is an integrated service, a restart message is sent to the service at 550 and this information is retained by the service manager 88 as the current networking environment at 512 and stored at 510, which is then used to analyze connection state and IP address changes as discussed above. If, however, the determination is made at 544 that the service is not an integrated service, the service is stopped at 552 and then a service startup sequence is initiated at 556. The service blocks forming the service are then supplied to the interface provider 152 at 554/376.

Alternatively still, if a determination is made at 514 that the user device 14 has disconnected from a network, the services provided by that network are suspended at 526. Similarly, if a determination is made at 514 that the user device 14 has timed out, the services are stopped at 516 and this information is retained by the service manager 88 as the current networking environment at 512.

The mobile-connectivity application 10 is designed to deal with the complexity of roaming among cellular and Wi-Fi networks for both mobile IP and non-mobile IP modes. A software-based solution that is network agnostic and resides on the user's device, the mobile-connectivity application 10 is uniquely designed to enable quick deployment of carrier-class data services that leverage the growing base of wireless access points without major changes in the network core. The mobile-connectivity application 10 is a carrier-class, universal-connectivity platform that resolves conventional operating system limitations by intelligently and transparently managing connectivity regardless of the network technology (e.g., WLAN, DSL, CDMA2000, GPRS, EDGE, etc).

As Wi-Fi hotspots have become increasingly prevalent, new difficulties and complexities have emerged. One issue is multiple SSIDs: the more Wi-Fi operators there are in a given area (say, an airport), the more SSIDs there will be broadcast to the laptop user. Windows does not know which is the correct SSID and will connect the user to the strongest SSID signal even if it is not the correct or desired SSID. Another issue is security. Additionally, carriers may use varying authentication schemes at their hotspots for reaching the internet, including on-location purchase of scratch cards. Thus, while Carrier A may use PPPoE to create secure links from a user's laptop to the Wi-Fi hotspot, Operator B may deploy L2TP to accomplish this secure link, and Operator C might be using web logon. Furthermore, the hotspot may be owned by the establishment itself, which would then resell the bandwidth from its ISP.

The end result of this is that for a user to be mobile they must obtain all the information regarding correct SSID, dialling capabilities, and authentication methods and credentials for each location they visit before they are able to connect. Unfortunately, this is a very burdensome task that may overwhelm most users. The mobile-connectivity application 10 utilizes databases to store information from the provider and from the operation of the application itself—as well as pushed from a carrier or other network operator. Thus, the user is not required to obtain all of the information that would otherwise be necessary because the mobile-connectivity application 10 stores and retrieves this information transparently from the various databases. Further, the mobile-connectivity application 10 is designed to make most of the decisions thereby reducing the possibility that the user has chosen a function by mistake.

Databases also present network operators with the opportunity to offer their customers network-based services such as content delivery and multimedia services. These are services that operators supply to their subscribers that expand on the current network with which they are connecting. Once the mobile-connectivity application 10 detects on which network it is roaming, the mobile-connectivity application 10 can associate with this network SSID a specific network image, a link to a website, and an HTML branding page.

To the user, the mobile-connectivity application 10 is a nearly invisible application at work continuously in the background connecting the user to a list of preferred networks that has been created by the carrier. The mobile-connectivity application 10 will also connect the user to new networks not on the list and automatically store that information for future use. The mobile-connectivity application 10 platform is based on a robust software model that allows the mobile-connectivity application 10 to intelligently detect a wireless (or wireline) network and then assemble the many layers of access protocols and required security/authentication mechanisms over any given network infrastructure. All this is done in a way that is completely transparent to the end-user.

To the carrier, however, the mobile-connectivity application 10 is a powerful platform rich with service functionality. The mobile-connectivity application 10 can be configured in many ways to satisfy the connectivity requirements of its subscribers. From simple Wi-Fi connectivity over web logon to complex roaming and connectivity over mobile IP, the mobile-connectivity application 10 is the future-proof solution that provides carriers with the tool to scale diverse wireless networks into a manageable whole without costly changes to the core carrier network.

With the mobile-connectivity application 10, carriers and other network operators will have the ability to offer their customers branded roaming data services over a wide range of access technologies. In short, the mobile-connectivity application 10 is a carrier-class service enabler for revenue generating wireless data services. Merging the convenience of wireless mobility with high-speed access to the Internet and Intranets creates new business opportunities for wireless operators. The mobile-connectivity application 10 allows operators to offer innovative services, not only to retain high-end data subscribers but also to generate new revenue streams through differentiated services specific to market segments.

A carrier-branded mobile-connectivity application 10 provides the end-user with full access to the bundle of a carrier's wireless data services. For example, an operator that offers GPRS, EDGE, 1xRTT, 1xEVDO wireless services to a user can now offer a roaming service that allows the user to connect through a public Wi-Fi hotspot (owned or leased by the operator). Re-authentication is performed in a behind-the-scenes manner by the mobile-connectivity application 10, removing this burden from subscribers. This is accomplished by having the service provider furnish the user with a downloadable database of Wi-Fi connectivity patterns to adapt to their current location. Supplying this form of seamless roaming encourages users to connect along various networks. This spurs the bundling of an operator's services, thereby creating customer loyalty to a carrier's service and away from competitor services—thus reducing churn.

The mobile-connectivity application 10 combats the end-user's reluctance for roaming on Wi-Fi by offering a painless and simplified connectivity solution (from an end-user standpoint) that will relax their fears of the perceived complexity and insecurity of using public access wireless connections. Consequently, operators will benefit from a dramatic increase in the demand for Wi-Fi hotspot access as well as temporary access (pay-per-use) to foreign networks. A principal benefit for operators who provide their subscribers with the mobile-connectivity application 10 is that the platform supports carrier grade connectivity management to all connections on the available access links. The mobile-connectivity application 10 automatically detects available networks, verifies the network connection according to an operator-provided database, implements the connection configuration required, and connects. By removing this task from users, operators can dictate the order of which access links are tried to guide customers onto the operator's choice of network. The mobile-connectivity application 10 can be used to connect across all LAN, Wi-Fi, GPRS, EDGE, 1xRTT, 1xEV-DO cards, and Bluetooth interfaces.

Another key benefit of providing customers with a single, mobile-connectivity application 10 is the bundling of all wireless data services. This provides users with easy access to all networks offered by the operator and permits the operator to offer customers one consolidated monthly statement that details which, and how often, services were utilized. By having the mobile-connectivity application 10 authenticate the user for each connection, the operator can track each user's individual bandwidth usage per session and bill the customer accordingly. Providing a simplified billing structure can be the key to customer satisfaction and customer loyalty.

Carriers can also build customized subscriber CDs containing extractable download packages that can be accessed by user via the mobile-connectivity application 10. These packages can include the foreign network connection patterns and customized branding and images (e.g., icons, logos, etc.). Carriers would also be able to manage subscribers online with live updates.

The mobile-connectivity application 10 fully supports strong authentication mechanisms thus removing impersonation and denial-of-service security threats. This mechanism can also be used for non-repudiation, where a request for service can be traced back to a specific user. In addition, all account information for dial-up connections are fully encrypted.

With a single click, the mobile-connectivity application 10 also provides continuous mobile IP connectivity supporting both co-located modes or through an infrastructure Foreign Agent. Network connections based on the user's profile & pre-configured preferences provide seamless access, session continuity (hand-off) and security/authentication mechanisms between active links as per the IETF mobile IP standards.

The mobile-connectivity application 10 provides numerous end-user specific features allowing for seamless application roaming and including inherent security and authentication mechanisms as well as user-friendly troubleshooting tools. The mobile-connectivity application 10 is designed to provide seamless connection and includes inherent security and authentication robustness to comply with carrier and corporate IT infrastructure requirements. The mobile-connectivity application 10 is a key enabler for the adoption of premium data services.

When required, the mobile-connectivity application 10 keeps the user informed about what is going on, through appropriate feedback within reasonable time. The system speaks the user's language, with words, phrases, and concepts familiar to the user and follows real-world conventions, making information appear in a natural and logical order.

The mobile-connectivity application 10 features an aesthetic and minimalist design. The user can see instantly that he has connectivity. The GUI is color coded for ease of use and to attract user's attention and help users recognize, diagnose, and recover from errors quickly. Error messages are expressed in plain language (no codes) and precisely indicate the problem and suggest a solution. It also includes a battery of diagnostic tools such as integrated "pings" routing table analyzer, TCP/IP connections, etc. If, after all this, it is still necessary for the user to contact customer support, the mobile-connectivity application 10 features a full log history that the user can send to the support agent for analysis.

A log viewer can provide a current and historical view of the connection activities and status. All network or system type events will be logged, including showing when different networks sessions have been initiated or terminated. Log information is critical when trying to troubleshoot various network problems, especially if intermittent.

The mobile-connectivity application 10 runs in the background as an icon in the system tray and can be opened at will for additional information or user interventions. Once opened, the mobile-connectivity application 10 shows all available network interfaces and all active access links. A user can access the full range of system set-up screens and security parameters. The opened mobile-connectivity application 10 also provides the user with a link to log activity reports that are very useful for troubleshooting and keeping track of the ongoing changes/activities of the mobile-connectivity application 10.

As eluded to above, the mobile-connectivity application 10 provides carrier-grade troubleshooting. The troubleshooting window allows the user, customer service engineers, and IT departments to troubleshoot potential network problems quickly and effectively. As network configurations can be complex, it is important that simple troubleshooting tools are available if connections do not work. Among many other services, the mobile-connectivity application 10 provides basic test functions such as ping, route tracing, dial testing, and spying on agent advertisement messages. Further, a configuration differences window may appears when changes are made with respect to the current/archived profile so the user can view the most recent modifications before saving them.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A method for selecting a network from one or more candidate networks accessible to a mobile device, the method comprising:

gathering, via a location inference engine of the mobile device, information relating to each of the one or more candidate networks accessible to the mobile device, the information being gathered from a service-provider database, a user-preferences database, an accumulated-experience database, or any combination thereof;

harmonizing the gathered information in relation to an associated network type;

evaluating, via a rule-based candidate selector of the mobile device, the harmonized information to allocate a weight to each of the candidate networks, the weight representing the desirability of each of the candidate networks;

determining, via an interface provider, the required resources to connect the mobile device to each of the candidate networks from information contained within the service-provider database, from information obtained by the end-user, and by self adaptive learning algorithms; and selecting at least one of the candidate networks to attempt to connect the mobile device based on the allocated weight of the candidate network.

2. The method of claim 1 further comprising reevaluating the one or more candidate networks as the information relating to the one or more candidate networks changes.

3. The method of claim 1, wherein the information gathered includes a media type, a network speed, and a signal threshold for the one or more candidate networks.

4. The method of claim 1, wherein the information gathered includes a level of security and an availability of credentials for the one or more candidate networks.

5. The method of claim 1, wherein the information gathered includes a rate of success, a level of user intervention, and a current connection state for the one or more candidate networks.

6. The method of claim 1, wherein the recognizable network types include at least a local area network, a wireless local area network, third-generation wireless, wireless fidelity, and dial-up.

7. The method of claim 1, wherein the numerical weight allocated to each of the one or more candidate networks is determined by summing individual pieces of normalized information.

8. The method of claim 1 further comprising connecting to a preferred network selected from the one or more candidate networks.

9. The method of claim 8, wherein the one or more candidate network allocated the highest numerical weight is the preferred network.

10. A computer readable storage medium encoded with instructions for directing a processor to perform the method of claim 1.

11. A method to control and integrate a plurality of services on a user device, the method comprising:

determining a mobile-device connectivity context, the plurality of services to integrate being dependent on the connectivity context;

defining each of the plurality of services by a set of preconditions to be satisfied and by a set of resources to be launched;

transforming each of the set of preconditions into a set of goals to be monitored;

monitoring the goals utilizing specialized monitoring components; and launching the appropriate resources once the goals have been satisfied;

wherein each of the plurality of service definitions is contained within an updatable service database, the updatable service database including the set of preconditions and the set of resources for each of the plurality of services.

12. The method of claim 11, wherein each of the plurality of service definitions are provided by one or more of a service provider, an administrator of the user device, or an end-user.

13. The method of claim 11, wherein the launching of the appropriate resources includes stopping conflicting services.

14. The method of claim 11, wherein the launching of the appropriate resources includes switching to alternative resources.

15. The method of claim 11 further comprising providing a system-specific application program interface for launching the appropriate resources.

16. The method of claim 11 further comprising suspending and resuming the appropriate resources enabling network flow-control and smoother recovery after a loss of communication with a network.

17. The method of claim 11, wherein the set of resources to be launched include executables, dynamic libraries, active components, virtual private network clients, and special routing entries to be maintained.

18. A computer readable storage medium encoded with computer executable instructions for directing a processor to perform the method of claim 11.

19. A method for connecting to a network on a plurality of mobile devices, the method comprising:

accumulating statistics and location information on a first mobile device, the statistics and location information relating to a plurality of networks accessible to the mobile device;

communicating the accumulated information to a logically centralized database;

distributing the accumulated information stored in the central database to the plurality of mobile devices to provide the plurality of mobile devices with up-to-date connection rules for connecting to the previously located plurality of networks; and connecting one or more of the plurality of mobile devices to one of the plurality of networks utilizing the connection rules distributed from the central database.

20. The method of claim 19, wherein the accumulated information includes information relating to one or more of a group that includes actual network speed, difficulty of connection by the first mobile device, stability of connection, local network congestion, media-access-control address for the first mobile device when the first mobile device attempts to spoof, method of authentication, and fees incurred.

21. The method of claim 19, wherein the central database is located on the first mobile device.

22. The method of claim 21, wherein the plurality of mobile devices is one or more mobile device operated by a same end-user as the first mobile device.

23. The method of claim 19, wherein the accumulated information is provided to a service provider to measure the level of quality offered by a partner network.

24. The method of claim 19, wherein the accumulated information includes subjective information and free-form information input by an end-user.

25. A computer readable storage medium encoded with instructions for directing a processor to perform the method of claim 19.

* * * * *

UNITED STATES PATENT AND TRADEMARK OFFICE
CERTIFICATE OF CORRECTION

PATENT NO. : 7,620,065 B2  Page 1 of 1
APPLICATION NO. : 11/188047
DATED : November 17, 2009
INVENTOR(S) : Eric Falardeau It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1148 days.

Signed and Sealed this

Twenty-sixth Day of October, 2010

David J. Kappos
*Director of the United States Patent and Trademark Office*